No. 642,986. Patented Feb. 6, 1900.
A. HÜSENER.
PROCESS OF MANUFACTURING CONICAL TUBES OR MASTS.
(Application filed Sept. 10, 1896.)

(No Model.)

Witnesses:
James R. Mansfield
Wm Cleary Sullivan

Inventor:
Adolph Hüsener
By Alexander & Dowell
Attorneys.

THE NORRIS PETERS CO., PHOTO-LITHO., WASHINGTON, D. C.

UNITED STATES PATENT OFFICE.

ADOLPH HÜSENER, OF DUISBURG, GERMANY, ASSIGNOR TO FRANZ JOSEF SEYFRIED, OF MULHEIM-ON-THE-RHINE, GERMANY.

PROCESS OF MANUFACTURING CONICAL TUBES OR MASTS.

SPECIFICATION forming part of Letters Patent No. 642,986, dated February 6, 1900.

Application filed September 10, 1896. Serial No. 605,390. (No specimens.)

*To all whom it may concern:*

Be it known that I, ADOLPH HÜSENER, a subject of the German Emperor, residing at Duisburg, Germany, have invented an Improvement in Processes of and Apparatus for the Production of Pipes or other Hollow Bodies, of which the following is a specification.

This invention is an improved process for the manufacture of conical tubes and masts and hollow bodies varying in size or in cross-section throughout the length.

The invention therefore consists in the novel process of making the tubes, &c., and in certain novel apparatus used in that process, as will be hereinafter described.

Figure 1:
Figure 4:
Figure 5:
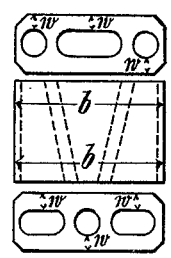
Figure 3:
Figure 8:
Figure 2:
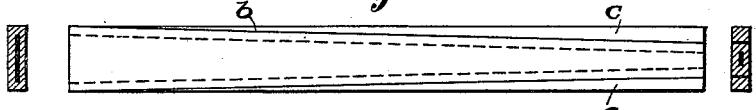
Figure 6:
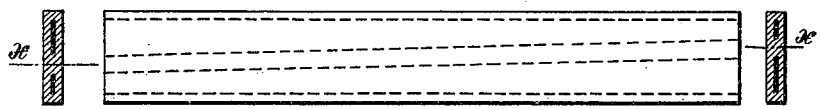
Figure 7:
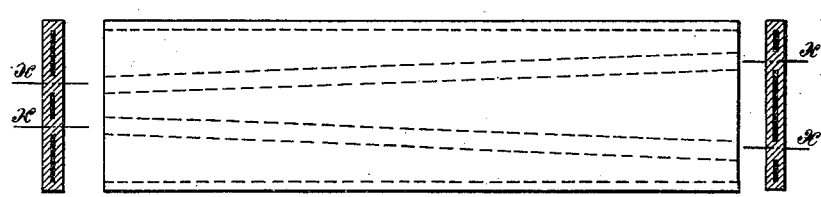

In the accompanying drawings, Figure 1 is a view of a form of ingot used in my process. Fig. 2 shows the resultant "double strip." Figs. 3, 4, and 5 are views of other forms of ingots. Figs. 6 and 7 show the resultant double strips produced by rolling the ingots shown in Figs. 4 and 5, respectively; and Fig. 8 is a section of a finished conical tube.

The invention is an improvement on the known process of producing pipes and hollow bodies by rolling out hollow ingots to double strips, which are subsequently expanded.

The present invention has for its object to produce directly by a novel improvement in the old process conical tubes or hollow bodies of variable cross-section, and in order to make such tubes of conical form I use ingots which are exteriorly cylindrical or uniform in cross-section and are interiorly conical and roll these ingots to exteriorly-cylindrical strips or to strips of exteriorly equal breadth. Afterward I cut off the exterior waste, and thus obtain exteriorly and interiorly conical strips, from which the conical tubes can be made by expansion. In short, I produce conical tubes by an improvement on the known process by employing exteriorly-cylindrical ingots.

For conical tubes the ingot *b* must be so shaped that it has an inner conical or flaring opening, while its exterior is of uniform cross-section. If such ingot is now rolled out in an ordinary rolling-mill under lateral pressure or in a closed caliber a double strip is obtained which has a uniform exterior width; but its interior bore is narrow at one end and gradually widens out toward the other end. In carrying out my process the exterior of the strip is then made to conform to the bore by cutting away the extraneous metal, (indicated at *c* in the drawings,) and thus a double strip is obtained which conforms in contour to the inner slot.

In order to prevent waste and to obtain a quicker mode of manufacture by rolling out simultaneously several strips, it is of advantage, especially for small tubes, to make large hollow ingots with two or more reversely-arranged conical openings, Figs. 4 and 5, and then roll the same out, Figs. 6 and 7, and to separate the resultant compound double strip by dividing it on the lines *x x* into independent double strips.

The manufacture of ingots (indicated in Figs. 4 and 5) will not be difficult and will considerably facilitate the manufacture of tubes of all kinds.

By cutting away the extra metal (see Fig. 2) or dividing the compound strips and then expanding the double strips they can be transformed into conical tubes or hollow bodies. When the expanding has been effected in part or entirely, the ribs which are formed by the expansion of the metal can be flattened out over the tongue-shaped mandrels. The expanding of the double strips thus obtained can be effected in any suitable way well known in the art.

Having thus described my invention, what I therefore claim as new, and desire to secure by Letters Patent thereon, is—

1. The herein-described process of manufacturing conical tubes, &c., consisting in taking an ingot of uniform exterior cross-section and forming therein an interiorly-tapered bore; then rolling out said ingot into a long flat double strip having a uniform exterior diameter or width, and a tapered interior; then cutting off the surplus metal from the sides of the strip so as to make its exterior contour conform to its interior; and then expanding said strip thereby forming a hollow conical tube, substantially as and for the purpose set forth.

2. The herein-described process of manufacturing conical tubes and masts from hollow bricks rolled out to double strips, which consists in forming the ingots with one or more conical openings, leaving the ingots, however, of the same exterior cross-section, rolling such ingots out into flat double strips, then cutting or separating these double strips so that the exterior thereof shall conform in contour to their interior bore, and subsequently expanding the double strips into conical tubes, substantially as described.

In witness whereof I have hereunto set my hand in presence of two witnesses.

ADOLPH HÜSENER.

Witnesses:
WILLIAM H. MADDEN,
TH. WALDAPFEL.